United States Patent [19]

Ainsworth et al.

[11] Patent Number: 4,639,388

[45] Date of Patent: Jan. 27, 1987

[54] CERAMIC-METAL COMPOSITES

[75] Inventors: John H. Ainsworth; Robert E. Shepler, both of Richardson, Tex.

[73] Assignee: Chromalloy American Corporation, Dallas, Tex.

[21] Appl. No.: 701,022

[22] Filed: Feb. 12, 1985

[51] Int. Cl.$^4$ .................................................. B32B 3/12
[52] U.S. Cl. .................................... 428/117; 428/222; 428/256; 428/469
[58] Field of Search ............... 428/116, 117, 222, 256, 428/469

[56] References Cited

U.S. PATENT DOCUMENTS

| | | | |
|---|---|---|---|
| 3,068,016 | 12/1962 | Dega | 428/117 X |
| 3,223,588 | 12/1965 | Pickel | 424/54 |
| 4,075,364 | 2/1978 | Panzera | 427/423 X |
| 4,209,334 | 6/1980 | Panzera | 427/34 X |
| 4,280,975 | 7/1981 | Ammann | 264/81 |
| 4,289,447 | 9/1981 | Sterman et al. | 264/81 X |
| 4,405,284 | 9/1983 | Albrecht et al. | 427/34 X |
| 4,409,054 | 10/1983 | Ryan | 428/117 X |
| 4,514,458 | 4/1985 | Thorn et al. | 428/222 |

Primary Examiner—Henry F. Epstein
Attorney, Agent, or Firm—Hopgood, Calimafde, Kalil, Blaustein & Judlowe

[57] ABSTRACT

A reinforced composite structure is disclosed comprising a heat resistant chemically-bonded layer of a ceramic composition mechanically attached to a metallic substrate. The structure includes a metallic anchoring matrix characterized by a plurality of spatially and cooperably arranged reinforcing elements, the matrix being attached to the substrate and projecting from the surface thereof with the spatially arranged reinforcing elements of the matrix collectively defining a ceramic-occupiable zone of finite thickness adjacent to and following the surface configuration of said substrate, the zone having at least confined therein the heat resistant chemically-bonded ceramic in intimate contact with the reinforcing elements. A method for fabricating said composite structure is also disclosed.

54 Claims, 14 Drawing Figures

CERAMIC-METAL COMPOSITES

This invention relates generally to ceramic-metal composites for use at elevated temperatures and, more particularly, to high temperature abradable ceramic-metal seals for use in thermal turbomachines, such as gas turbines and compressors.

STATE OF THE ART

It is known to use abradable seals on turbine shrouds made of heat resistant alloys in order to minimize gas leakage in both compressor and turbine sections and to assure efficient operation of gas turbine engines. Although the engine is typically designed and manufactured to precise dimensional tolerances, thermal and centrifugal expansion of relatively rotating members make zero clearances difficult to achieve. Thus, abradable seals are commonly employed on one of two relatively rotating surfaces. Low density abradable seals allow penetration of rotating members, thereby establishing desired gas leakage control.

Engine efficiency is also known to improve with increasing turbine operating temperatures. Low density (porous or distended) metallic abradables used in turbine sealing applications experience definite temperature limitations. These limitations are chiefly due to poor oxidation resistance and in some cases melting. For this reason, ceramic materials are deemed viable candidates for high temperature abradable applications. However, ceramic materials usually exhibit much less thermal expansion or contraction than metals at any given temperature. Thus, the permanent attachment of ceramic materials to metal substrates is usually severely limited in light of the large strains encountered through high temperature differential expansions. Ceramic laminates tend to fail by spalling or peeling when subjected to extreme temperature changes, e.g., by shear strains primarily parallel to the substrate and by tensile strains primarily perpendicular to the substrate.

Many attempts have been made to improve the performance of ceramic laminates, such as abradable seals. For example, in U.S. Pat. No. 4,075,364 (and U.S. Pat. No. 4,209,334), a ceramic-metal composite laminate is disclosed consisting of an inner ceramic layer, an outer metal layer and an intermediate interface layer of low modulus metallic low density structure having a high melting point. Actually, the intermediate interface layer is a metal pad, one face of which is brazed to the substrate (e.g., the turbine shroud); whereas, the other face has a plasma sprayed layer comprised of a mixture of ceramic material and a sacrificial material selected from the group consisting of graphite, plastic, aluminum, copper, sawdust, etc. The sacrificial material is removed by chemical reaction or by oxidation to provide a porous ceramic structure. The plasma sprayed ceramic only superficially enters the metal pad, the metal pad maintaining substantially its identity (open structure) as an intermediate interface layer.

U.S. Pat. Nos. 4,280,975 and 4,289,447 are of interest in that these patents are directed to a metal-ceramic turbine shroud and to a method of making it, the metal-ceramic structure being a seal which is mechanically secured to the metal substrate comprising the shroud. The patent states that the means for securing the ceramic layer is a mechanical matrix bonding means disposed between the metal substrate and the ceramic sealing layer. A particular matrix is one comprising metallic pegs integral with and spatially arranged on the surface of the substrate. A honeycomb structure may be used. A metal bonding layer, an alloy known as NiCrAlY, is flame sprayed on the substrate, including the metallic pegs, following which a ceramic sealing layer is applied by plasma spraying or by sintering. The ceramic layer preferably comprises zirconium dioxide or zirconium phosphate, the zirconium dioxide being stabilized by either magnesium oxide (MgO) or yttrium oxide ($Y_2O_3$). The ceramic layer is caused to develop an ordered pattern of very fine cracks in order to reduce or minimize thermal stresses in the ceramic sealing layer.

In U.S. Pat. No. 4,405,284, a heat insulation liner is disclosed for use on the casing of a turbine engine, the liner comprising a multilayered arrangement of ceramic and metal. According to the patent, a metal bond layer is first flame sprayed on the casing wall. Following this, the ceramic heat insulation layer is then deposited on the bond coat (e.g., by plasma spraying), the ceramic layer being applied before any cooling of the bond coat occurs. An abradable coating is then deposited over the ceramic layer as a top coat, the coating being in the form of a porous, predominantly metallic composition, the top coat being applied before any cooling of the ceramic layer. The casing liner may incorporate a honeycomb structure which is brazed to the coating wall. The honeycomb structure is only partially filled with the ceramic layer, the empty space above the ceramic layer being preferably filled with a porous predominantly metallic top layer.

A disadvantage of the aforementioned systems is that complete filling of the honeycomb structure is difficult. A further disadvantage is that the control of the ceramic microstructure is limited and material property control is thereby limited.

It is known to use certain phosphate compounds in the production of bonded insulating material for use as a heat shield at the very high temperatures encountered by re-entry vehicles from outer space as they re-enter the earth's atmosphere at high speeds. For example, in U.S. Pat. No. 3,223,588, a foamed or cellular insulating material is disclosed comprising a composite of zirconia and zirconium phosphate. According to one embodiment disclosed, the foamed zirconium material may be produced by mixing granular zirconia, cerium oxide, a small amount of aluminum powder, water, and phosphoric acid (85% concentrated). The solids are mixed first, the water and phosphoric acid being then added to produce a foaming action in which steam and hydrogen are evolved which impart a light cellular structure to the reaction mass. The cellular mass is then subjected to a temperature of about 280° F. (138° C.) to 800° F. (427° C.) for a period of several hours to effect hardening of the resulting product. However, this structure is too weak and erodable for use as an abradable seal.

OBJECTS OF THE INVENTION

It is an object of the invention to provide as an article of manufacture a ceramic-metal composite.

Another object of the invention is to provide a ceramic-metal composite in the form of a high temperature abradable seal.

A still further object of the invention is to provide a method for producing a ceramic-metal composite, such as an abradable seal.

These and other objects will more clearly appear when taken in conjunction with the following disclosure, the appended claims, and the accompanying drawings as follows:

IN THE DRAWINGS

SUMMARY OF THE INVENTION

Figure 1:
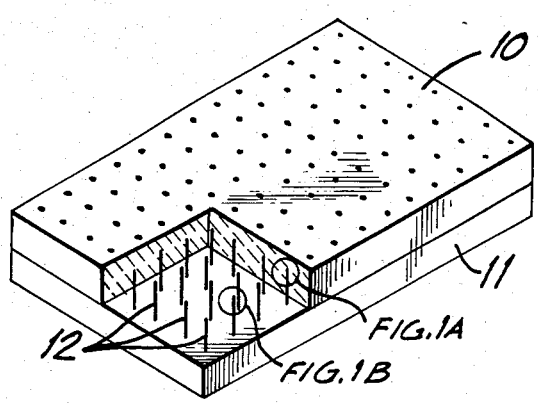
FIG. 1 depicts one embodiment of the reinforced composite structure of the invention comprising an array of studs substantially uniformly spaced on and attached to or integral with a metal substrate to provide a metallic anchoring matrix for supporting and mechanically bonding a ceramic layer to said substrate.

In its broad aspects, the invention is directed to insulating ceramic-metal composites, e.g., turbine engine seals, in which the ceramic layer is comprised of a chemically-bonded composition, the chemical bonding being one produced at a low temperature using a low-temperature bonding agent. The temperature of bonding is below the normal sintering temperature of the ceramic composition without the low-temperature bonding agent present. Sintering temperatures are generally in excess of about 2190° F. (1200° C.). The bonding temperature employed is below about 2000° F. (1095° C.). The low-temperature chemical bonding agent employed is one which is compatible with the ceramic composition. A preferred bonding agent is a phosphate compound, such as phosphoric acid and aluminum phosphate. Other bonding agents may include chromic acid, sodium silicate, colloidal silica and/or silica gel, and the like.

The low bonding temperature is important in order to avoid degradation of the physical properties of the substrate which can occur if too high a bonding temperature is employed.

The low-temperature bond is used in conjunction with a metallic anchoring reinforcement system made from heat resistant alloys to provide a high temperature abradable seal or thermal barrier/insulation coating. The anchoring system is in effect a metal matrix which is designed so that the mechanical bonding forces are primarily perpendicular to the substrate. This is desirable as it minimizes failure of the ceramic layer by shear strains parallel to the substrate and by tensile strains perpendicular to the substrate.

One embodiment of the invention is directed to a reinforced composite structure comprising a heat resistant layer of a chemically-bonded ceramic composition mechanically attached to a metallic substrate, the structure including a metallic anchoring matrix characterized by a plurality of spatially and cooperably arranged reinforcing elements, the matrix being substantially uniformly attached over the surface of the substrate and projecting from the surface thereof with the spatially arranged reinforcing elements of the matrix collectively defining a ceramic-occupiable zone of finite thickness adjacent to and following the surface configuration of the substrate, the zone having at least confined therein the heat resistant chemically-bonded ceramic layer in intimate, mechanically-bonded contact with the reinforcing elements, whereby the layer of reinforced heat resistant ceramic is strongly mechanically bonded to the substrate by virtue of the metallic matrix attached to the substrate.

The chemical bond is a low temperature bond produced by adding a compatible chemical bonding agent to the ceramic composition, such as a phosphate compound, the mixture then at least confined within the anchoring matrix and heated to a bonding temperature below the normal sintering temperature of the ceramic composition. As stated previously, the normal sintering temperature of the ceramic is that temperature employed without the presence of the low-temperature bonding agent. For example, the low-temperature bonding is generally below about 2000° F. (1095° C.).

In producing the ceramic composition, the dry ceramic raw materials are mixed together in their proper proportions using conventional ceramic mixing equipment such as a blender, jar mill or hand stirring with a spatula. After initial mixing, the chemical-bonding compound, e.g., phosphoric acid, is added and thoroughly blended with the ceramic constituents. The ceramic formulation is then pressed, cast, or rammed onto the substrate using the previously attached anchoring system or matrix to hold the material in place. A die or form may be utilized to effect the final shape of the ceramic. The piece is dried to remove moisture from the system, for example, by drying for at least about six hours at 180° F. (82° C.). After drying, the article is heated to a chemical bonding temperature of below about 2000° F. (1095° C.), e.g. from about 500° F. (260° C.) to 1300° F. (705° C.) for several hours.

The anchoring system can be any heat resistant metal. The configuration of the high temperature metal can be honeycomb, random metallic fibers, wire coils, studs, tangs, wire mesh or others. The anchoring system attached to the substrate can be either an integral part of the substrate or it can be metallurgically bonded thereto.

The resulting ceramic-metallic composite has particular use as an abradable seal, although it also has utility as a thermal barrier insulation coating, or in other applications involving high temperature protection of metallic surfaces.

Another embodiment of the invention is directed to a method for fabricating a composite structure comprising a heat resistant layer of a chemically-bonded ceramic composition mechanically attached to a metallic substrate. The method comprises providing a metallic substrate with a metallic anchoring matrix characterized by a plurality of spatially and cooperably arranged reinforcing elements, the matrix being substantially uniformly attached over the surface of the substrate and projecting from the surface thereof with the reinforcing elements of the matrix collectively defining a ceramic-occupiable zone of finite thickness adjacent to and following the surface configuration of the substrate. The steps further include confining at least within the zone a layer of heat resistant chemically-bondable ceramic composition in intimate contact with said reinforcing elements, drying the confined ceramic composition, and heating the confined chemically-bondable ceramic composition to a temperature below its normal sintering temperature as described hereinbefore, whereby a reinforced layer of chemically-bonded heat resistant ceramic is produced strongly mechanically bonded to the substrate by virtue of the metallic matrix attached thereto.

DETAILED DESCRIPTION OF THE INVENTION

The Ceramic Composition

The ceramic composition may comprise a variety of specific combinations of high temperature refractory materials. The materials may include: zirconium dioxide, $ZrO_2$; aluminum oxide, $Al_2O_3$; magnesium oxide, MgO; calcium oxide, CaO; yttrium oxide, $Y_2O_3$; hafnium dioxide, $HfO_2$; chromium oxide, $Cr_2O_3$; silicon dioxide, $SiO_2$; thorium dioxide, $ThO_2$; silicon carbide, SiC; and cerium dioxide, $CeO_2$. An example of a formulation that uses several of the above materials is as follows:

| | |
|---|---|
| −35 + 60 U.S. sieve size yttrium oxide stabilized zirconium dioxide agglomerate | 40.9 wt % |
| −100 + 250 U.S. sieve size yttrium oxide stabilized zirconium dioxide agglomerate | 32.0 wt % |
| 5 micron aluminum oxide | 18.0 wt % |
| Phosphoric acid | 9.1 wt % |
| (85% concentrated acid) | |

In the aforementioned formulation, the zirconium dioxide is stabilized primarily in its cubic crystalline form by the addition of 16.9% by weight yttrium oxide. The yttrium oxide is in solid solution with the zirconium dioxide. Other minor constituents as listed above may be present. The zirconium dioxide may be stabilized by other additives, such as CaO, MgO, etc.

As is well known to those skilled in the art, stabilizers may range in amounts from about 3% to 25% by weight of the zirconium dioxide-stabilizer mixture.

Where it is desired to employ a composition containing substantial amounts of zirconium dioxide, it is preferred that at least about 40% by weight of zirconium dioxide be present in the composition.

In addition to the aforementioned oxide ceramic materials, chemical binders such as phosphoric acid, aluminum phosphate and other phosphate-containing chemicals are preferably included. Water, phenolic resin, epoxy resins and other polymers, such as synthetic or natural viscosifiers, are included as required to yield the proper consistency and porosity. Examples of synthetic viscosifiers are ethyl cellulose, methyl cellulose and carboxymethyl cellulose. Natural viscosifiers include guar gum and derivatives thereof. Guar gum has 5 to 8 times the thickening power of starch. The proper consistency of the ceramic mix is determined by the ceramic-forming technique used. The level of porosity influences the mechanical and thermal properties of the final ceramic product. In its final form, the ceramic body may have a porosity ranging from about 10–90% by volume, preferably between about 25–50% for turbine seal applications. Thus, the desired porosity can be obtained by blending together coarse and fine particles at various ratios or by adding pore formers, e.g., decomposable organic materials.

The oxide ceramics can be used in the form of agglomerates of specific size. The agglomerates are pre-reacted and sintered ceramic powders with or without binders. The sintered powders are crushed and sized utilizing conventional ceramic processing techniques. The porosity of the agglomerates can also be controlled to provide means of controlling the overall porosity of the ceramic product.

The Metallic Component of the Composite

The second part of the ceramic-metal composite is the metallic component. The metallic component is made of an alloy, preferably malleable, that generally contains combinations of some of the following elements: nickel, cobalt, iron, chromium, manganese, aluminum, titanium, zirconium, tungsten, molybdenum, hafnium, carbon, silicon and boron in the form of nickel-base, nickel-cobalt-base, cobalt-base, and iron-base alloys. Examples of such heat resistant alloys are given as follows:

A nickel-base alloy known by the trademark Hastelloy X (Cabot Corporation) containing by weight 22% Cr, 1.5% Co, 9% Mo, 0.6% W, 18.5% Fe, 0.5% Mn, 0.5% Si, 0.1% C and the balance Ni; a nickel-base alloy identified as Alloy 214 (Cabot Corporation) containing 16% Cr, 2.5% Fe, 4.5% Al, 0.01% Y and the balance Ni; a nickel-cobalt-base alloy known by the trademark Inconel 700 containing 15% Cr, 28.5% Co., 3.7% Mo, 0.7% Fe, 2.2% Ti, 3% Al, 0.4% Mn, 0.3% Si, 0.12% C and the balance nickel; a nickel-base alloy identified by the trademark MAR-M246 containing 9% Cr, 10% Co, 2.5% Mo, 10% W, 1.5% Ti, 5.5% Al, 0.015% B, 0.05% Zr, 1.5% Ta, 0.15% C and the balance Ni; and a heat resistant iron-base alloy known by the trademark A-286 containing 15% Cr, 26% Ni, 1.3% Mo, 2% Ti, 0.2% Al, 0.015% B, 1.35% Mn, 0.5% Si, 0.05% C and the balance Fe.

The metallic portion of the composite is used as the anchoring system. It may be attached to the metallic substrate being protected in a variety of ways, for example, by brazing, welding, diffusion bonding or incorporated as an integral part of the substrate. The objective is to achieve strong mechanical bonding between the ceramic anchoring system and the ceramic itself. The mechanical bonding should be primarily perpendicular to the surface being protected. A number of anchoring configurations can be used including: cellular structures, such as honeycomb structures, egg crate structures, and the like, with or without side wall treatment, for example, side wall treatment in which the walls are crimped, kinked or perforated by holes punched in the side walls. Wire mesh preferably oriented perpendicular to the surface being protected may be employed, as well as such reinforcing elements as wire studs, tangs, randomly oriented metallic fibers and other types of reinforcing elements cooperably and spatially arranged on the substrate in the form of a ceramic-supporting matrix.

It is preferred that the metallic anchoring matrix have a substantially unitary structure, such as cellular structures, interconnecting randomly oriented metal fibers, and an intermingled arrangement of wire coils of wire mesh.

The anchoring system or matrix is either metallurgically bonded to the substrate by brazing, welding or diffusion bonding or it is produced by casting as an integral part of the substrate. If brazed, a suitable braze composition should be used at proper brazing temperatures. A typical nickel-base alloy braze is one designated as AMS 4779. The nominal composition by weight of AMS 4779 braze is: 94.5% nickel, 2.0% boron and 3.5% silicon. A suitable brazing temperature would be about 2130° F. (1165° C.). A lower brazing temperature may also be employed, depending upon the braze alloy selected. The time at temperature is very short, e.g., typically less than about 10 minutes.

The ceramic may be combined with the anchoring system or matrix by several readily used ceramic-forming techniques. Such techniques may comprise dry powder pressing, casting or ramming. Dry powder pressing uses pressure to form dry or nearly dry ceramic powders and binders into desired shapes and sizes. Preferably, the powder mixture is slightly damp and tends to stick together when squeezed in the palm of one's hand. The amount of pressure needed can vary over an extremely wide range depending on the amount of water present or the kind and amount of binders used. Slip-casting, using liquids to form a slurry with the ceramic powders and binders so they can be poured or otherwise formed to shape, may be employed. Ramming generally requires enough liquid to make the ceramic powders and binders plastically formable using low pressure, including pressure applied by hand such as with the use of a spatula. If dry powder pressing is employed, suitable dies and rams are necessary. Forms may also be made for casting and ramming; however, under certain conditions and in accordance with the anchoring matrix employed, no forms need be used when producing the ceramic layer by casting or ramming. The ramming technique, using a plastically formable ceramic mix, is particularly suited for attaching the ceramic-metal composite to a full-circle cylindrical configuration, such as a turbine shroud.

The heat treatment required to yield the final ceramic bond consists first of driving out the moisture that may be present. This can be achieved by drying the ceramic composition at temperatures from room temperature to about 200° F. (93° C.), with the time at temperature being as little as four hours, although shorter times can be employed. While the ceramic bond is generally produced by heat treatment at temperatures below about 2000° F. (1095° C.), it is preferred, depending on the chemical bonding agent used, to employ a heat treatment at temperatures ranging up to about 1300° F. (705° C.), e.g. about 500° F. (260° C.) to 1300° F. (705° C.) preferably for at least about six hours at the preselected temperature. To take full advantage of the bond forming characteristics, 700° F. (371° C.) to 1100° F. (593° C.) is the preferred heat treatment temperature range when using phosphate-bonding agents.

As illustrative of the various types of metallic matrices that can be employed in carrying out the invention, reference is made to FIGS. 1 to 9.

Figure 1B:
FIGS. 1A and 1B are illustrative of the type of studs that can be employed as reinforcing elements of the metallic anchoring matrix.
Figure 1A:
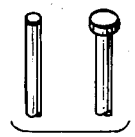

FIG. 1 depicts a section in three dimensions of a ceramic-metal composite comprising a ceramic layer 10 mechanically bonded to a metal substrate 11, e.g., a portion of a turbine shroud, via a metallic anchoring matrix comprising a plurality of spatially and cooperably arranged reinforcing elements in the form of a substantially uniform array of studs 12 bonded to or integral with substrate 11. The studs may have various shapes as shown in FIG. 1A (plain or nail head) and FIG. 1B in which the stud has an enlarged mid-section for further mechanically bonding or coupling the ceramic layer 10 to the supporting matrix. The studs are arranged sufficiently close to each other, preferably in staggered rows, to assure the interruption of or to minimize the formation of horizontal strains that may occur during thermal shock. The mechanical coupling is primarily substantially perpendicular to the surface of the substrate. If there is a wide disparity in thermal expansion between the ceramic layer and the substrate, shear strains are developed horizontal to the substrate surface. Also, tensile strains arise in the direction perpendicular to the substrate surface. In both cases, these strains can lead to cracking parallel to the substrate surface. In the absence of additional bonding or anchoring forces perpendicular to the substrate surface, the ceramic layer tends to peel off of or spall from the surface.

Figure 2:
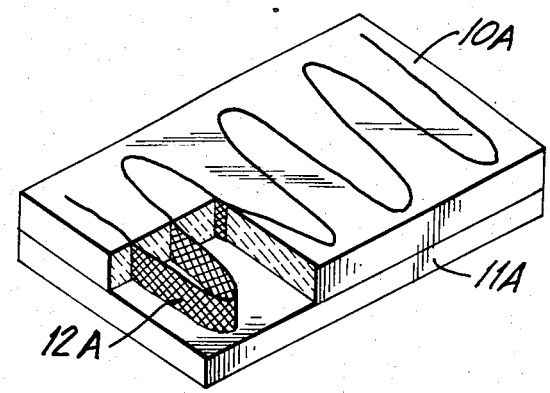
FIG. 2 is illustrative of another embodiment of the invention showing the use of a wire mesh strip as a unitary structural matrix sinuously arranged on and metallurgically bonded to a metal substrate with the strip standing on edge like a fence substantially perpendicular to the substrate, the wire mesh strip being embedded in the ceramic layer.

FIG. 2 shows a ceramic-metal composite comprising a ceramic layer 10A mechanically bonded to a metal substrate 11A via a metallic anchoring matrix 12A comprising a wire mesh strip in which the reinforcing elements are a plurality of interwoven wires. The strip is disposed on edge transverse to the surface of the substrate, for example, substantially perpendicular thereto, with the strip side winding sinuously across the surface of the substrate as shown. A strong mechanical bond is achieved between the ceramic 10A and the anchoring matrix by virtue of the penetration of the ceramic into and through the interstices of the woven wire strip. The strip is metallurgically bonded to the metal substrate.

Figure 3:
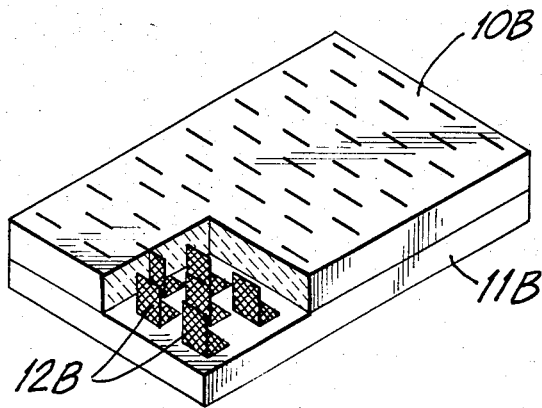
FIG. 3 is an embodiment of the invention showing the use of L-shaped wire mesh tabs attached to the metal substrate and substantially uniformly spaced from each other as shown to provide a metallic anchoring matrix, a leg of each tab being metallurgically bonded to the substrate.
Figure 3A:
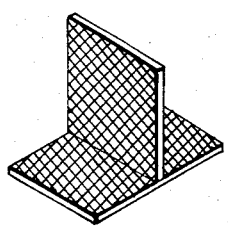
FIG. 3A is illustrative of another embodiment of a wire mesh tab in the form of an inverted T for use as in FIG. 3.

In the embodiment of FIG. 3, wire mesh tabs 12B are used as the reinforcing elements for mechanically bonding ceramic layer 10B to substrate 11B. The wire mesh tabs are L-shaped with the legs thereof metallurgically bonded to substrate 11B to provide the anchoring matrix. It is preferred that the tabs be staggered as shown in the figure which also depicts tab 12B in FIG. 3A having two legs (inverted "T"). The tabs are embedded in ceramic layer 10B.

Figure 4:
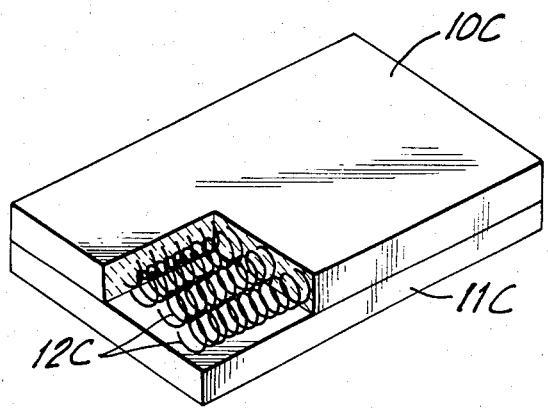
FIG. 4 depicts a further embodiment of the invention in which a plurality of wire coils are arranged side-by-side peripherally intermingled or partially enmeshed to provide an anchoring matrix in the form of a unitary structure for supporting a layer of ceramic as shown, the coils being metallurgically bonded to the substrate, such as by brazing, welding or diffusion bonding.

The ceramic-metal composite of FIG. 4 depicts the use of wire coils 12C arranged side-by-side on and metallurgically bonded (e.g. brazed) to substrate 11C, the coils being peripherally intermingled as shown to provide in effect a unitary anchoring matrix embedded in ceramic layer 10C strongly mechanically bonded to substrate 11C.

Figure 5:
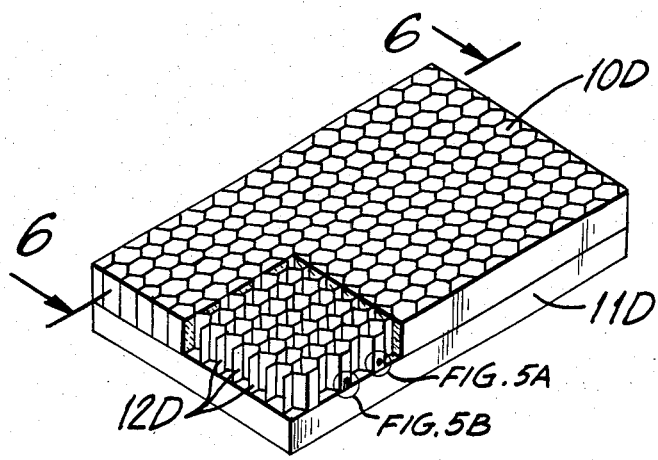
FIG. 5 shows one embodiment of an anchoring matrix comprising a honeycomb structure bonded to a metal substrate and supporting a ceramic layer which is confined within the cellular structure or zone of the matrix.
Figure 5A:
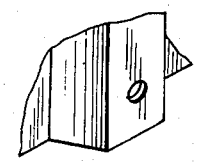
FIGS. 5A and 5B are fragments of the cell walls of the honeycomb structure or matrix of FIG. 5 illustrating a preferred embodiment in which wall perforations (rectangular or circular openings) are employed to provide means for effecting the mechanical bonding of the ceramic layer to the anchoring matrix comprising said honeycomb structure.
Figure 5B:
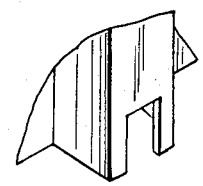

FIG. 5 is a preferred embodiment of a ceramic-metal composite in which the metallic anchoring matrix attached to substrate 11D is a honeycomb structure. The plurality of reinforcing elements are hexagonal cells 12D into which is confined ceramic layer 10D. A section of the composite is shown with the ceramic omitted to more clearly show the cellular structure of the matrix, including the side walls. The side walls of the cells are preferably perforated with a hole as shown in FIG. 5A or a slot as shown in FIG. 5B to provide improved mechanical bonding of the ceramic with the unitary structure of the honeycomb.

Figure 6:
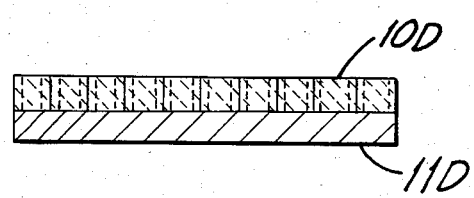
FIG. 6 is a longitudinal cross section of the anchoring matrix of FIG. 5 taken along line 6—6.

FIG. 6 is a cross-section of FIG. 5 taken along line 6—6 as shown.

Figure 7:
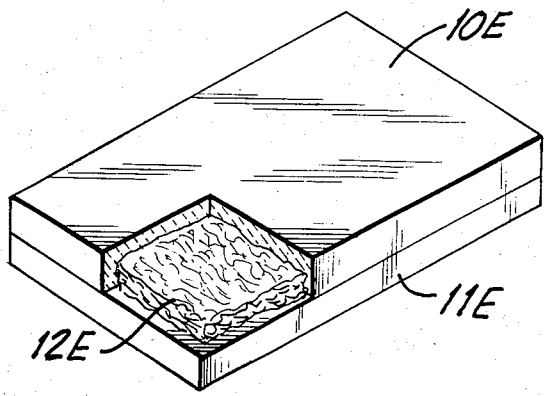
FIG. 7 depicts an additional embodiment of the reinforced composite structure of the invention in which randomly oriented metal fibers in the form of a unitary structure (e.g., sintered metal fibers) are used to provide support for the ceramic layer, the fibers in the form of a mat, which mat is embedded in and therefore mechanically bonded to the ceramic.

The ceramic-metal composite of FIG. 7 illustrates the use of a metal mat or pad of randomly oriented metal fibers 12E as a unitary structure attached to substrate 11E by, for example, brazing, the ceramic layer 10E permeating the interstices of the mat substantially completely to provide a strong mechanical bond thereof to the substrate.

Figure 8:
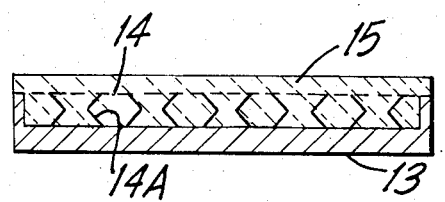
FIG. 8 is a cross section of a reinforced composite structure of the invention showing the ceramic layer extending beyond the surface of the anchoring matrix.

FIG. 8 is a cross-section of a ceramic-metal composite comprising a metal substrate 13 of a high temperature alloy to which is metallurgically bonded, e.g., brazed or welded, an anchoring matrix 14 having an egg crate structure with angularly deformed side walls 14A filled with a chemically bonded ceramic plus an excess to provide an outer layer 15 as shown. The deformed side walls assure strong mechanical bonding of the ceramic layer to the substrate.

Figure 9:
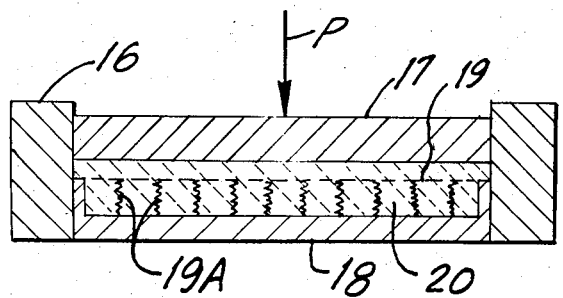
FIG. 9 shows schematically a die arrangement for pressing a ceramic mixture into the open structure of a metal anchoring matrix.

As stated earlier, one method of filing the open spaces of the anchoring matrix with a ceramic composition is by pressing using a die arrangement as shown in FIG. 9. An open rectangular die ring 16 is snugly fitted around metal substrate 18 to which is attached anchoring matrix 19 by brazing or welding. The reinforcing elements 19A (side walls) of the matrix are deformed, e.g., crinkled, to assure mechanical bonding of the ceramic to matrix 19. The side walls may be crinkled during pressing, if desired. The open spaces of the anchoring matrix are filled with a ceramic composition 20. A die block 17 is placed into the rectangular die ring as shown and a pressure P applied to force the ceramic substantially completely into the open spaces of the matrix. The view shown is before completion of the pressing.

The invention offers the following advantages.

Low temperature can be used to form the ceramic bond; hence, heat damage to engine parts is avoided. Several different ceramic fabrication techniques are readily available and adaptable, the techniques including pressing, casting and ramming.

The use of low temperatures to form the ceramic bond results in energy savings over conventional heat treatment techniques.

The thickness of the seal can be readily varied up to 1 inch or greater. A thickness of as little as about thirty thousandths can be produced.

The microstructure and properties can be custom tailored to different requirements, thus providing control over abradability, erosion resistance and hardness.

The long term thermal stability is greater in the ceramic-metal composite compared to metal per se.

An advantage of ceramic components is that they are not subject to degradation through oxidation as generally occurs with metal coatings.

Moreover, since thermal conductivities of the ceramic are very low, excellent insulating properties are assured.

As illustrative of the invention, the following examples are given:

EXAMPLE 1

A cellular structure in the form of a honeycomb with overall dimensions of $\frac{1}{4} \times 15/16 \times 2$ 15/16 inches and with $\frac{1}{4}$ inch hexagonal cells and 0.002 inch wall thickness was brazed to a $\frac{1}{8} \times 1\frac{1}{8} \times 3\frac{1}{8}$ inch nickel alloy substrate. The honeycomb was made from Hastelloy X having a composition by weight of about 22% chromium, about 18.5% iron, about 9% molybdenum, about 1.5% cobalt, about 0.6% tungsten, about 0.5% manganese, about 0.5% silicon, about 0.1% carbon and the balance essentially nickel. A braze alloy identified as Amdry 788 (Alloy Metals, Inc.) was employed having a composition by weight of about 22% chromium, about 21% nickel, about 14% tungsten, about 2% boron, about 2% silicon, about 0.03% lanthanum and the balance cobalt. An acrylic adhesive was sprayed on one $1\frac{1}{8} \times 3\frac{1}{8}$ inch surface of the substrate. The braze powder was then sprinkled on the tacky adhesive surface. The honeycomb was centered on the surface and the assembly was heated under vacuum to 2300° F. (1260° C.). The sample was held at that temperature for only three minutes and then cooled to room temperature.

A ceramic batch formulation was prepared having the following composition by weight.

| | |
|---|---|
| −35 + 60 U.S. sieve size calcium oxide stabilized zirconium dioxide hollow spheres | 40.2% |
| −100 + 250 U.S. sieve size calcium oxide stabilized crushed zirconium dioxide hollow spheres | 23.0% |
| 5 micron aluminum oxide powder | 26.8% |
| Phosphoric acid | 10.0% |

Four percent by weight of calcium oxide was used to stabilize the zirconium dioxide. The dry powders were mixed by tumbling in a jar mill; after which, the phosphoric acid was added and mixed with the oxide constituents by hand.

The phosphoric acid used in all of the examples was 85% concentrated.

A rectangular die designed to make $\frac{1}{4} \times 1 \times 3$ inch wafers was placed on top of the honeycomb substrate assembly. The die walls surrounded the honeycomb and rested on top of the substrate. The die cavity was charged with the ceramic formulation and the ceramic was pressed into the honeycomb cells under a pressure of 10,000 psi (pounds per square inch) using a die block fitted into the rectangular die. The resulting piece was dried at 176° F. (80° C.) for six hours and then heat treated at 700° F. (371° C.) for four hours.

The test piece was then exposed to more than 1000 thermal shock cycles. The thermal shock test entailed cycling the ceramic side of the sample between approximately 1100° F. (593° C.) to 2300° F. (1260° C.). The metal substrate side of the sample was cycled between 750° F. (400° C.) to 1225° F. (663° C.). A hydrogen-oxygen torch was used to heat the ceramic side and a propane-oxygen torch was used on the substrate side. Approximately ten seconds were required to heat both sides to their respective upper temperatures. The sample was maintained at the high temperatures for one minute and then cooled for one minute by blowing air on the substrate side. Upon reaching 750° F. (400° C.) on the substrate side, the cycle was repeated.

After the thermal shock treatment, the sample was cut for tensile testing and microscopic examination. Tensile strengths ranged from 300 psi to 700 psi. The microscopic examination revealed that the honeycomb walls were crinkled. These crinkled walls provided a mechanical bond between the honeycomb and the ceramic while the hard, strong ceramic, in turn, kept the metallic walls crinkled. Massive delaminations, normally seen on samples made by different techniques were absent following completion of the thermal shock test.

EXAMPLE 2

Parallelogram-shaped pieces of honeycomb, 1×1.3 inches, with ⅛ inch hexagonal cells, 0.002 inch wall thickness and 0.080 inch height, were brazed to vane sections used in a first stage turbine of a gas turbine engine. The honeycomb composition was the same as that described in Example 1. The braze alloy employed was that designated as AMS 4777 having a composition by weight of about 7% Cr, about 3.2% B, about 4.5% Si, about 3% Fe and the balance essentially nickel. The brazing procedure employed was the same as that described in Example 1 except that the brazing temperature was 1960° F. (1070° C.). Prior to brazing the honeycomb, slots of about 0.020 inch wide by about 0.025 inch high were cut into the walls on the side of the honeycomb to be brazed to the vane sections.

A ceramic oxide formulation having the following composition by weight was made:

| | |
|---|---|
| −35 + 60 U.S. sieve size yttrium oxide stabilized zirconium dioxide agglomerate | 40.5% |
| −100 + 250 U.S. sieve size yttrium oxide stabilized zirconium dioxide agglomerate | 31.7% |
| 5 micron aluminum oxide powder | 17.8% |
| Phosphoric acid | 10.0% |

The zirconium dioxide was stabilized with 16.9% yttrium oxide.
All mixing was done as described in Example 1.

The agglomerate used in the composition given was made from 5 micron yttrium oxide stabilized zirconium dioxide powder. A preblend of 18.9% by weight glycerin, 13.9% by weight colloidal silica, 1.7% by weight of a viscosifier (referred to by the designation Jaguar Polymer 315 which is a guar derivative) and 65.5% by weight water was mixed in a blender. The zirconium dioxide powder was then added until the total mixture consisted of approximately 17% preblend and 83% zirconium dioxide. The material was then extruded in the shape of ¼ inch diameter "noodles." These "noodles" were air dried, calcined at 2012° F. (1100° C.) and sintered at 3000° F. (1650° C.). The resulting hard-fired product contained between 30–40% porosity by volume. The product was ground in a roll crusher, screened to the U.S. sieve sizes given above and acid leached in a mixture of nitric acid and hydrochloric acid to remove iron picked up from the crushing operation.

The ceramic oxide mixture was pressed into the honeycomb cells at a pressure of 6500 psi using a die as in Example 1. After drying 16 hours at 176° F. (80° C.) and heat treating at 700° F. (371° C.) for four hours, the ceramic surfaces of the pieces were ground so that the total height of the ceramic-honeycomb composite was between 0.050 and 0.060 inches. The honeycomb cell edges were exposed on the ground surface of the ceramic.

The slots in the honeycomb walls discussed earlier allowed the ceramic to extrude from one cell to another affording mechanical grab. The ceramic itself may be viewed as a series of pieces having small cross section perpendicular to the direction of heat travel. This small cross section limits the magnitude of thermal strains that arise and generally enhances thermal shock resistance.

EXAMPLE 3

A piece of honeycomb, 15/16×2 15/16 inches, with ⅛ inch hexagonal cells, 0.002 inch wall thickness and 0.080 inch height was brazed to a nickel alloy substrate. The honeycomb composition was made of Hastelloy X as described in Example 1. The same brazing procedure was used, except that the alloy was AMS 4779 comprising by weight about 94.5% Ni, about 2% B and 3.5% Si, the brazing temperature employed being about 2130° F. (1165° C.).

Holes approximately 1/32 inch in diameter were punched through the side walls of the honeycomb close to the bottom of the cells. Each cell had two diametrically opposed walls with holes. The purpose of these holes was to enhance mechanical bonding.

A ceramic oxide batch formulation was produced having the following composition by weight:

| | |
|---|---|
| −35 + 60 U.S. sieve size yttrium oxide* stabilized zirconium dioxide hollow spheres | 19.0% |
| −35 + 60 U.S. sieve size yttrium oxide** stabilized zirconium dioxide agglomerate | 19.0% |
| −60 + 100 U.S. sieve size yttrium oxide** stabilized zirconium dioxide agglomerate | 5.7% |
| −100 + 250 U.S. sieve size yttrium oxide** stabilized zirconium dioxide agglomerate | 13.3% |
| 5 micron yttrium oxide** stabilized zirconium dioxide powder | 6.7% |
| 5 micron aluminum oxide powder | 21.9% |
| Phosphoric acid | 9.5% |
| Phenolic resin hollow spheres | 0.6% |
| Water | 4.3% |

*20% yttrium oxide stabilized zirconium dioxide
**16.9% yttrium oxide stabilized zirconium dioxide After the dry constituents were blended in a jar mill, phosphoric acid and water were added and blended in by hand using a spatula. After mixing, the material had a paste-like consistency.

The mix was rammed into honeycomb using a spatula because of the plasticity of the mix. The sample was dried at 176° F. (80° C.) for 16 hours and heat treated at 700° F. (371° C.) for 16 hours. The surface of the ceramic was ground down so that the honeycomb anchor was exposed. The thickness of the ceramic-metal composite was 0.070 inches. The sample was exposed to 650 thermal shock cycles as described in Example 1. After completion of the cycles, the sample was exposed to constant heating on the ceramic side for a cumulative 78 hours. During this latter treatment, the temperature on the ceramic side was between 2100° F. (1150° C.) to 2350° F. (1288° C.) while the unheated substrate side equilibrated at 1100° F. (593° C.). After this treatment, the sample was examined and found to have suffered negligible damage.

EXAMPLE 4

Coils of 0.010 inch diameter nickel-chrome wire were formed on a mandrel. The coils were approximately ¼ inch in diameter and approximately 3 inches long. Five such coils were brazed lengthwise and side-by-side to a ⅛×1⅛×3⅛ inch nickel alloy substrate, the coils being peripherally intermingled or overlapped with respect to each other substantially across the width of the substrate. The braze composition and procedure employed were essentially the same as in Example 3. A form or die was placed around the coils so that a ceramic mixture having dimensions of ¼×1×3 inch could be rammed in place on top of, into and around the coils. The ceramic composition was the same as that given in Example 3, including the drying and heat treatment.

EXAMPLE 5

A ceramic oxide composition was applied to a curved substrate having a recessed land and having integrally cast studs or posts for anchoring. The land was 1½×4¼ inches and was recessed to ⅛ inch in depth. The posts or studs were approximately 1/32×3/32 inches×⅛ inch high and were spaced approximately 3/16 to ¼ inch apart. The radius of curvature of the substrate was approximately 14 inches.

The ceramic oxide formulation had the following composition by weight:

| | |
|---|---|
| −35 + 60 U.S. sieve size aluminum oxide hollow spheres | 40.2% |
| −100 + 250 U.S. sieve size crushed aluminum oxide spheres | 23.0% |
| 5 micron aluminum oxide powder | 26.8% |
| Phosphoric acid | 10.0% |

As will be noted, the ceramic oxide composition comprises essentially aluminum oxide.

A block of wood was cut such that one face was concave with the same radius as the outer radius of the substrate. A second block of wood was cut such that one face was convex with the same radius as the inner radius of the substrate. These wood blocks served as pressing rams, the convex block being placed on top of the substrate, with the concave block brought in mating contact with the bottom of the substrate.

The ceramic composition which was slightly damp was spread evenly into the recess of the substrate until it filled the recess and was approximately 3/16 inch above the top. This material was then pressed into the recess at 2500 psi using the wood rams as described above. The sample was dried and heat treated as described in Example 1.

The sample was subject to 90 thermal shock cycles as described in Example 1. Following the thermal shock treatment, the sample was examined under a stereo microscope and found to have suffered no detectable thermal shock damage.

EXAMPLE 6

A ceramic formulation having the following composition by weight was made:

| | |
|---|---|
| −35 + 60 U.S. sieve size aluminum oxide hollow spheres | 40.2% |
| −100 + 250 U.S. sieve size aluminum oxide crushed spheres | 23.0% |
| 5 micron aluminum oxide powder | 26.8% |
| Mono aluminum phosphate | 10.0% |

The formulation was mixed as described in Example 1. Ceramic wafers, 3/16×1×3 inches, were pressed at a pressure of 10,000 psi. These wafers were dried at 176° F. (80° C.) and heat treated at 700° F. (371° C.) as described in Example 1.

The physical properties of the wafers were as follows:

| | |
|---|---|
| Three point bend strength | 2561 psi |
| Hardness, $R_{45C}$ scale | 75 |
| Bulk density | 2.50 gm/cc |
| Apparent porosity | 32.1% |
| Apparent specific gravity | 3.68 |

Test procedures for determining the physical properties are well known to those skilled in the art. The three point bend strength was determined over a 2 inch span, the wafers being freely supported on two knife edge supports about 1 inch across and 2 inches apart with the load applied at the center of the span.

This example shows that phosphate-containing compounds, other than phosphoric acid, can be used to form a low temperature bond.

EXAMPLE 7

A ceramic formulation having the following composition by weight was made:

| | |
|---|---|
| −35 + 60 U.S. sieve size yttrium oxide* stabilized zirconium dioxide hollow spheres | 19.0% |
| −35 + 60 U.S. sieve size yttrium oxide** stabilized zirconium dioxide agglomerate | 19.0% |
| −60 + 100 U.S. sieve size yttrium oxide** stabilized zirconium dioxide agglomerate | 5.7% |
| −100 + 250 U.S. sieve size yttrium oxide** stabilized zirconium dioxide agglomerate | 13.3% |
| 5 micron yttrium oxide** stabilized zirconium dioxide powder | 6.7% |
| 5 micron aluminum oxide powder | 21.9% |
| Phosphoric acid | 4.8% |
| Colloidal silica | 4.8% |
| Phenolic resin hollow spheres | 0.6% |
| Water | 4.2% |

*20% yttrium oxide
**16.9% yttrium oxide

This composition was mixed as described in Example 3, the material having a paste-like consistency after mixing.

The material was rammed into a rectangular steel mold designed to form ⅛×1×3 inch wafers. A spatula was used to ram the samples. The wafers were dried at 176° F. (80° C.) for 16 hours and heat treated at 700° F. (371° C.) for 16 hours. After this heat treatment, the low temperature formed ceramic bond was present, despite the lower level of phosphoric acid used (4.8% as compared to 9.5 and 10.0% for other formulations described in previous examples).

The purpose of the colloidal silica is to form a second bond at elevated temperatures.

EXAMPLE 8

Coils of 0.010 inch diameter nickel-chrome alloy wire (80% Ni-20% Cr) were formed on a mandrel and brazed to a ⅛×1⅛×3⅛ inch nickel-alloy substrate as described in Example 4.

A ceramic formulation having the following composition by weight was made:

| | |
|---|---|
| −35 + 60 U.S. sieve size yttrium oxide* stabilized zirconium dioxide hollow spheres | 19.8% |
| −35 + 60 U.S. sieve size yttrium oxide** stabilized zirconium dioxide agglomerate | 19.8% |
| −60 + 100 U.S. sieve size yttrium oxide** stabilized zirconium dioxide agglomerate | 6.0% |
| −100 + 250 U.S. sieve size yttrium oxide** stabilized zirconium dioxide agglomerate | 13.9% |
| 5 micron yttrium oxide** stabilized zirconium dioxide powder | 7.0% |
| 5 micron aluminum oxide powder | 22.9% |
| Phosphoric acid | 10.0% |
| Phenolic resin hollow spheres | 0.6% |

*20.0% yttrium oxide
**16.9% yttrium oxide

A die designed to make 1×3 inch wafers having thicknesses of up to one inch was placed on top of the coil-substrate assembly. The die walls surrounded the coils and rested on top of the substrate. The die cavity was charged with the ceramic formulation. Care was taken to assure that the material was placed into and around the coils. The ceramic material was then pressed to a ¾×1×3 inch shape under a pressure of 10,000 psi. The sample was dried at 176° F. (80° C.) for 16 hours and heat treated at 700° F. (371° C.) for 16 hours.

The resulting sample was well bonded to the substrate. This example illustrates that a thick sample can be made utilizing the methods described in the present invention.

EXAMPLE 9

A ceramic formulation of the following composition by weight was made:

| | |
|---|---|
| −35 + 60 U.S. sieve size dead burned magnesium oxide | 40.5% |
| −100 + 250 U.S. sieve size dead burned magnesium oxide | 31.7% |
| 5 micron aluminum oxide powder | 17.8% |
| Phosphoric acid | 10.0% |

Mixing of the above sample was as described in Example 1. Ceramic wafers, 3/16×1×3 inches were pressed at a pressure of 10,000 psi. These wafers were dried at 176° F. (80° C.) for 16 hours and heat treated at 700° F. (371° C.) for 16 hours.

Three point bend strengths of 2300 psi and hardness ($R_{45C}$ scale) of 72 were measured on the samples. This example shows that a predominately magnesium oxide ceramic can be employed in carrying out the present invention.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A reinforced composite structure comprising a heat resistant chemically-bonded layer of a ceramic composition mechanically attached to a metallic substrate, said structure including a metallic anchoring matrix characterized by a plurality of spatially and cooperably arranged reinforcing elements, said matrix being substantially uniformly attached over the surface of said substrate and projecting from the surface thereof with the spatially arranged reinforcing elements of said matrix collectively defining a ceramic-occupiable zone of finite thickness adjacent to and following the surface configuration of said substrate, said zone having at least confined therein said heat resistant chemically-bonded ceramic composition in intimate and mechanically-bonded contact with said reinforcing elements, said chemically-bonded ceramic composition having been produced by mixing a low-temperature chemical bonding agent with said ceramic composition and heating said composition to a low temperature below the normal sintering temperature of said ceramic when the low-temperature chemical bonding agent is not present, said chemical bonding temperature being below about 1095° C., whereby said composition of reinforced heat resistant ceramic is strongly mechanically bonded as a layer to said substrate by virtue of said metallic matrix attached to said substrate.

2. The reinforced composite structure of claim 1, wherein said metallic matrix is attached to said substrate by a metallurgically-produced bond, wherein said chemical bonding agent is selected from the group consisting of phosphoric acid, aluminum phosphate, chromic acid, sodium silicate, colloidal silica and silica gel, and wherein said chemical bonding temperature ranges up to about 705° C.

3. The reinforced composite of claim 2, wherein said metallurgically-produced bond is selected from the group consisting of brazing, welding and diffusion-bonding.

4. The reinforced composite structure of claim 1, wherein the metallic anchoring matrix attached to said metallic substrate includes anchoring matrices selected from the group consisting of cellular structures, a unitary structure of randomly oriented metallic fibers, peripherally intermingled side-by-side arrangement of wire coils, substantially uniformly spaced studs and/or tangs and wire mesh, the cooperable arrangement of the reinforcing elements being such relative to the substrate that the anchoring or mechanical bonding forces are primarily disposed in a direction substantially perpendicular to the surface of the substrate, whereby failure of the reinforced ceramic layer by shear strains parallel to the substrate and by tensile strains perpendicular to the substrate is substantially inhibited.

5. The reinforced composite structure of claim 4, wherein the metallic anchoring matrix is a substantially unitary structure selected from the group consisting of cellular structures, randomly oriented fibers, an intermingled arrangement of wire coils and wire mesh.

6. The reinforced composite structure of claim 1, wherein the chemically-bonded ceramic composition is selected from the group consisting of $ZrO_2$, $Al_2O_3$, $MgO$, $CaO$, $Y_2O_3$, $HfO_2$, $Cr_2O_3$, $SiO_2$, $ThO_2$, $CeO_2$ and SiC and mixtures of at least two of the compounds.

7. The reinforced composite structure of claim 6, wherein the chemically-bonded ceramic composition is substantially a phosphate-bonded composition.

8. The reinforced composite structure of claim 7, wherein the ceramic composition is comprised substantially of a phosphate-bonded stabilized zirconium dioxide ($ZrO_2$) composition.

9. The reinforced composite structure of claim 6, wherein the chemically-bonded ceramic composition is porous and has a pore volume ranging from about 10% to 90% of the volume of said ceramic composition.

10. The reinforced composite structure of claim 9, wherein the pore volume ranges from about 25% to 50%.

11. The reinforced composite structure of claim 5, wherein the unitary structure forming the metallic anchoring matrix is a cellular structure with at least the zone defined by said structure filled with a chemically-bonded ceramic composition comprised substantially of phosphate-bonded stabilized zirconium dioxide ($ZrO_2$).

12. The reinforced composite structure of claim 11, wherein the walls making up the cellular structure are provided with means to aid in the mechanical bonding of the ceramic composition to said cellular structure.

13. The reinforced composite structure of claim 12, wherein the mechanical-bonding means is selected from the group consisting of perforated walls and deformed walls.

14. The reinforced composite structure of claim 1, wherein the metallic anchoring matrix is a heat resistant alloy selected from the group consisting of nickel-base, nickel-cobalt-base, cobalt-base and iron-base alloys.

15. A reinforced composite structure comprising a heat resistant layer of a chemically-bonded ceramic composition mechanically attached to a metallic substrate,
said structure including a metallic anchoring matrix characterized by a unitary structure formed of a plurality of spatially and cooperably arranged reinforcing elements,
said matrix being substantially uniformly metallurgically bonded to said substrate and projecting from the surface thereof with the spatially arranged reinforcing elements of said matrix collectively defining a ceramic-occupiable zone of finite thickness adjacent to and following the surface configuration of said substrate,
said zone having at least confined therein said heat resistant chemically-bonded ceramic composition in intimate and mechanically-bonded contact with said reinforcing elements,
said chemically-bonded ceramic composition having been produced by mixing a low-temperature bonding agent with said ceramic composition and heating said mixture to a low temperature below the normal sintering temperature of said ceramic when the low-temperature chemical bonding agent is not present, said chemical bonding temperature being below about 1095° C., wherein said composition of reinforced heat resistant ceramic is strongly mechanically bonded as a layer to said substrate by virtue of said metallic matrix metallurgically bonded to said substrate.

16. The reinforced composite structure of claim 15, wherein said low temperature chemical bonding agent is selected from the group consisting of phosphoric acid, aluminum phosphate, chromic acid, sodium silicate, colloidal silica and silica gel, wherein the chemical bonding temperature ranges up to about 705° C., and wherein the unitary structure making up the metallic anchoring matrix includes anchoring matrices selected from the group consisting of cellular structures, randomly oriented metallic fibers, peripherally intermingled side-by-side arrangement of wire coils, and wire mesh, the cooperable arrangement of the reinforcing elements being such relative to the substrate that the anchoring or mechanical bonding forces are primarily disposed in a direction substantially perpendicular to the surface of the substrate, whereby failure of the reinforced ceramic layer by shear strains parallel to the substrate and by tensile strains perpendicular to the substrate is substantially inhibited.

17. The reinforced composite structure of claim 15, wherein the metallurgical bond is selected from the group produced by brazing, welding and diffusion-bonding.

18. The reinforced composite structure of claim 15, wherein the metallic anchoring matrix is a substantially unitary structure selected from the group consisting of cellular structures, randomly oriented fibers, an intermingled arrangement of wire coils and wire mesh.

19. The reinforced composite structure of claim 15, wherein the chemically-bonded ceramic composition is selected from the group consisting of $ZrO_2$, $Al_2O_3$, $MgO$, $CaO$, $Y_2O_3$, $HfO_2$, $Cr_2O_3$, $SiO_2$, $ThO_2$, $CeO_2$ and $SiC$ and mixtures of at least two of the compounds.

20. The reinforced composite structure of claim 19, wherein the chemically-bonded ceramic composition is substantially a phosphate-bonded composition.

21. The reinforced composite structure of claim 20, wherein the ceramic composition is comprised substantially of a phosphate-bonded stabilized zirconium dioxide ($ZrO_2$) composition.

22. The reinforced composite structure of claim 19, wherein the chemically-bonded ceramic composition is porous and has a pore volume ranging from about 10% to 90% of the volume of said ceramic composition.

23. The reinforced composite structure of claim 22, wherein the pore volume ranges from about 25% to 50%.

24. The reinforced composite structure of claim 15, wherein the unitary structure forming the metallic anchoring matrix is a cellular structure with the zone defined by said structure filled with a chemically-bonded ceramic composition comprised substantially of phosphate-bonded stabilized zirconium dioxide ($ZrO_2$).

25. The reinforced composite structure of claim 24, wherein the walls making up the cellular structure are provided with means to aid in the mechanical bonding of the ceramic composition to said cellular structure.

26. The reinforced composite structure of claim 25, wherein the mechanical-bonding means is selected from the group consisting of perforated walls and deformed walls.

27. The reinforced composite structure of claim 15, wherein the metallic anchoring matrix is a heat resistant alloy selected from the group consisting of nickel-base, nickel-cobalt-base, cobalt-base and iron-base alloys.

28. As an article of manufacture, a heat resistant abradable seal for use at elevated temperatures formed of a reinforced composite structure comprising a heat resistant chemically-bonded layer of a ceramic composition mechanically attached to a metallic substrate,
said structure including a metallic anchoring matrix characterized by a plurality of spatially and cooperably arranged reinforcing elements, said matrix being substantially uniformly attached over the surface of said substrate and projecting from the surface thereof with the spatially arranged reinforcing elements of said matrix collectively defining a ceramic-occupiable zone of finite thickness adjacent to and following the surface configuration of said substrate, said zone having at least confined therein said heat resistant chemically-bonded ceramic composition in intimate and mechanically-bonded contact with said reinforcing elements, said chemically-bonded ceramic composition having been produced by mixing a low-temperature chemical bonding agent with said ceramic composition and heating said mixed composition to a low temperature below the normal sintering temperature of said ceramic when the low-temperature chemical bonding agent is not present, said chemical bonding temperature being below about 1095° C., whereby said abradable seal is strongly mechanically bonded as a layer to said substrate by virtue of said metallic matrix attached to said substrate.

29. The abradable seal of claim 28, wherein the metallic matrix is attached to said substrate by a metallurgically-produced bond.

30. The abradable seal of claim 28, wherein the metallurgically-produced bond is selected from the group consisting of brazing, welding and diffusion-bonding.

31. The abradable seal of claim 28, wherein said low temperature chemical bonding agent is selected from the group consisting of phosphoric acid, aluminum phosphate, chromic acid, sodium silicate, colloidal silica and silica gel, wherein the chemical bonding temperature ranges up to about 705° C., and wherein the metallic anchoring matrix attached to said metallic substrate includes anchoring matrices selected from the group consisting of cellular structures, a unitary structure of randomly oriented metallic fibers, peripherally intermingled side-by-side arrangement of wire coils, substantially uniformly spaced studs and/or tangs and wire mesh, the cooperable arrangement of the reinforcing elements being such relative to the substrate that the anchoring or mechanical bonding forces are primarily disposed in a direction substantially perpendicular to the surface of the substrate, whereby failure of the abradable seal strains parallel to the substrate and by tensile strains perpendicular to the substrate is substantially inhibited.

32. The abradable seal of claim 31, wherein the metallic anchoring matrix is a substantially unitary structure selected from the group consisting of cellular structures, randomly oriented fibers, an intermingled arrangement of wire coils and wire mesh.

33. The abradable seal of claim 28, wherein the chemically-bonded ceramic composition forming the seal is selected from the group consisting of $ZrO_2$, $Al_2O_3$, $MgO$, $CaO$, $Y_2O_3$, $HfO_2$, $Cr_2O_3$, $SiO_2$, $ThO_2$, $CeO_2$ and $SiC$ and mixtures of at least two of the compounds.

34. The abradable seal of claim 33, wherein the chemically-bonded ceramic composition is substantially a phosphate-bonded composition.

35. The abradable seal of claim 34, wherein the ceramic composition is comprised substantially of a phosphate-bonded stabilized zirconium dioxide ($ZrO_2$) composition.

36. The abradable seal of claim 33, wherein the chemically-bonded ceramic composition is porous and has a pore volume ranging from about 10% to 90% of the volume of said ceramic composition.

37. The abradable seal of claim 36, wherein the pore volume ranges from about 25% to 50%.

38. The abradable seal of claim 32, wherein the unitary structure forming the metallic anchoring matrix is a cellular structure with at least the zone defined by said structure filled with a chemically-bonded ceramic composition is substantially a phosphate-bonded stabilized zirconium dioxide ($ZrO_2$).

39. The abradable seal of claim 38, wherein the walls making up the cellular structure are provided with means to aid in the mechanical bonding of the ceramic composition to said cellular structure.

40. The abradable seal of claim 39, wherein the mechanical-bonding means is selected from the group consisting of perforated walls and deformed walls.

41. The reinforced composite structure of claim 28, wherein the metallic anchoring matrix is a heat resistant alloy selected from the group consisting of nickel-base, nickel-cobalt-base, cobalt-base and iron-base alloys.

42. As an article of manufacture, a heat resistant abradable seal for use at elevated temperatures formed of a reinforced composite structure comprising a heat resistant layer of a chemically-bonded ceramic composition mechanically attached to a metallic substrate, said structure including a metallic anchoring matrix characterized by a unitary structure formed of a plurality of spatially and cooperably arranged reinforcing elements, said matrix being substantially uniformly metallurgically bonded to said substrate and projecting from the surface thereof with the spatially arranged reinforcing elements of said matrix collectively defining a ceramic-occupiable zone of finite thickness adjacent to and following the surface configuration of said substrate, said zones having at least confined therein said heat resistant chemically-bonded ceramic composition in intimate and mechanically-bonded contact with said reinforcing elements, said chemically-bonded ceramic composition having been produced by mixing a low-temperature bonding agent with said ceramic composition and heating said mixture to a low temperature below the normal sintering temperature of said ceramic when said low-temperature chemical bonding agent is not present, said chemical bonding temperature being below about 1095° C., whereby said abradable seal is strongly mechanically bonded as a layer to said substrate by virtue of said metallic matrix metallurgically bonded to said substrate.

43. The abradable seal of claim 42, wherein said low temperature chemical bonding agent is selected from the group consisting of phosphoric acid, aluminum phosphate, chromic acid, sodium silicate, colloidal silica and silica gel, wherein the chemical bonding temperature ranges up to about 705° C. and wherein the unitary structure making up the metallic anchoring matrix includes anchoring matrices selected from the group consisting of cellular structures, randomly oriented metallic fibers, peripherally intermingled side-by-side arrangement of wire coils, and wire mesh, the cooperable arrangement of the reinforcing elements being such relative to the substrate that the anchoring or mechanical bonding forces are primarily disposed in a direction substantially perpenicular to the surface of the substrate, whereby failure of the abradable seal by shear strains parallel to the substrate and by tensile strains perpendicular to the substrate is substantially inhibited.

44. The abradable seal of claim 42, wherein the metallurgical bond is selected from the group produced by brazing, welding and diffusion-bonding.

45. The abradable seal of claim 42, wherein the metallic anchoring matrix is a unitary structure selected from the group consisting of cellular structures, randomly oriented fibers, an intermingled arrangement of wire coils and wire mesh.

46. The abradable seal of claim 42, wherein the chemically-bonded ceramic composition is selected from the group consisting of $ZrO_2$, $Al_2O_3$, $MgO$, $CaO$, $Y_2O_3$, $HfO_2$, $Cr_2O_3$, $SiO_2$, $ThO_2$, $CeO_2$ and SiC and mixtures of at least two of the compounds.

47. The abradable seal of claim 46, wherein the chemically-bonded ceramic composition is substantially a phosphate-bonded composition.

48. The abradable seal of claim 47, wherein the ceramic composition is comprised substantially of a phosphate-bonded stabilized zirconium dioxide ($ZrO_2$) composition.

49. The abradable seal of claim 46, wherein the chemically-bonded ceramic composition is porous and has a pore volume ranging from about 10% to 90% of the volume of said ceramic composition.

50. The abradable seal of claim 49, wherein the pore volume ranges from about 25% to 50%.

51. The abradable seal of claim 45, wherein the unitary structure is a cellular structure with the zone defined by said structure filled with a chemically-bonded ceramic composition comprised substantially of phosphate-bonded stabilized zirconium dioxide ($ZrO_2$).

52. The abradable seal of claim 51, wherein the walls making up the cellular structure are provided with means to aid in the mechanical bonding of the ceramic composition to said cellular structure.

53. The abradable seal of claim 52, wherein the mechanical-bonding means is selected from the group consisting of perforated walls and deformed walls.

54. The abradable seal of claim 42, wherein the metallic anchoring matrix is a heat resistant alloy selected from the group consisting of nickel-base, nickel-cobalt-base, cobalt-base and iron-base alloys.

* * * * *